United States Patent

[11] 3,543,690

| [72] | Inventor | Samuel Lee |
| | | Audenshaw, England |
| [21] | Appl. No. | 750,188 |
| [22] | Filed | Aug. 5, 1968 |
| [45] | Patented | Dec. 1, 1970 |
| [73] | Assignee | S. H. Heywood & Company Limited |
| | | Reddish, Stockport, England |
| | | a body corporate of Great Britain |
| [32] | Priority | Aug. 15, 1967 |
| [33] | | Great Britain |
| [31] | | No. 37473/67 |

[54] WHEEL OR DRUM DRIVES
1 Claim, 4 Drawing Figs.

[52] U.S. Cl. .................................................. 105/163;
74/802; 104/98; 105/133, 105/108; 212/124
[51] Int. Cl. ....................................................... F16h 1/26;
B66c 9/10, B66c 17/00
[50] Field of Search ........................................... 74/802;
212/18, 124; 104/163

[56] References Cited
UNITED STATES PATENTS

| 1,223,259 | 4/1917 | Cottam.......................... | 74/802 |
| 2,231,784 | 2/1941 | Von Thurgen .............. | 74/802 |
| 2,441,111 | 5/1948 | Delaplace..................... | 74/802 |
| 2,717,147 | 9/1955 | Fejmert et al................ | 74/802X |
| 2,722,851 | 11/1955 | Steiner......................... | 74/802 |
| 3,143,899 | 8/1964 | York............................. | 74/802X |

FOREIGN PATENTS

| 453,914 | 12/1949 | Italy............................. | 74/802 |

*Primary Examiner*—Arthur T. McKeon
*Attorney*—Norris and Bateman

ABSTRACT: A wheel or drum drive unit employing a motor driven spindle driving planetary pinions and further pinions mounted on shafts journalled in the wheel or drum, the further pinions engaging stationary pinions concentric with the spindle to cause the wheel or drum to rotate about end casings.

INVENTOR:
SAMUEL LEE

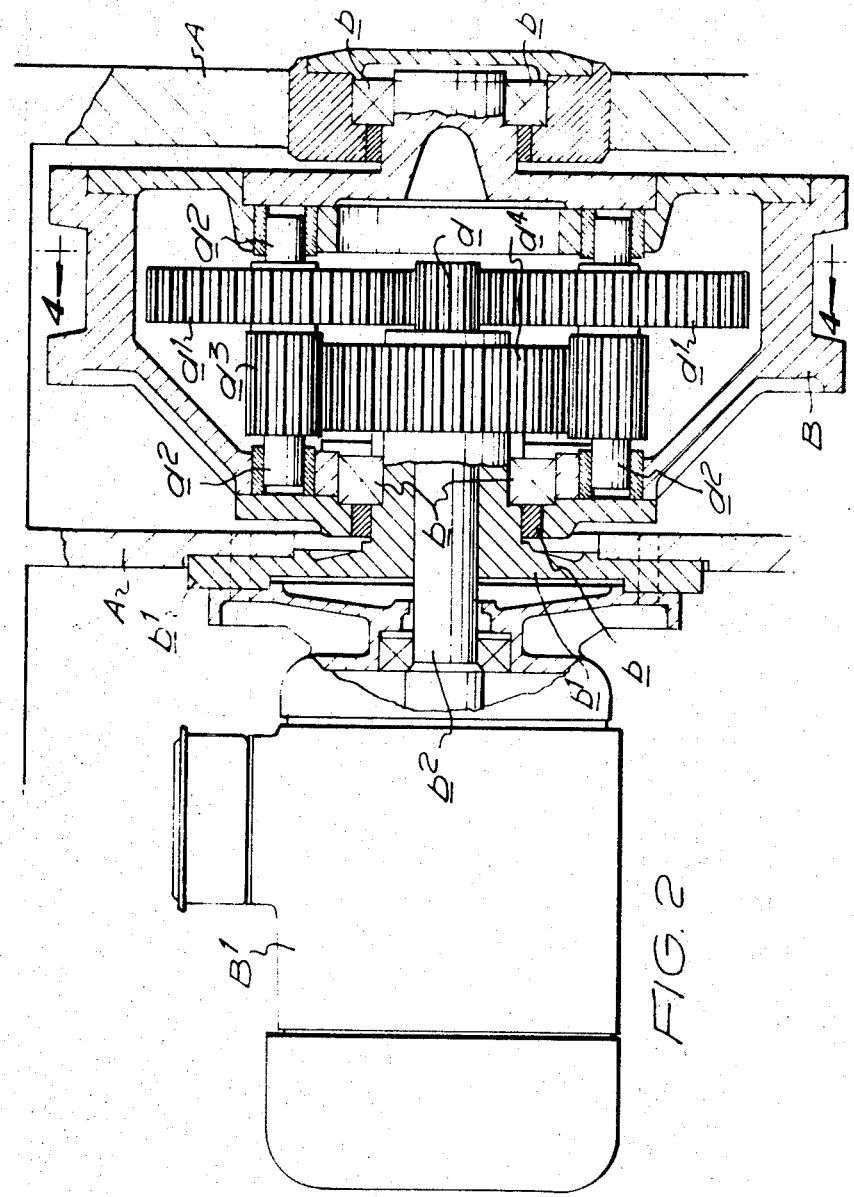

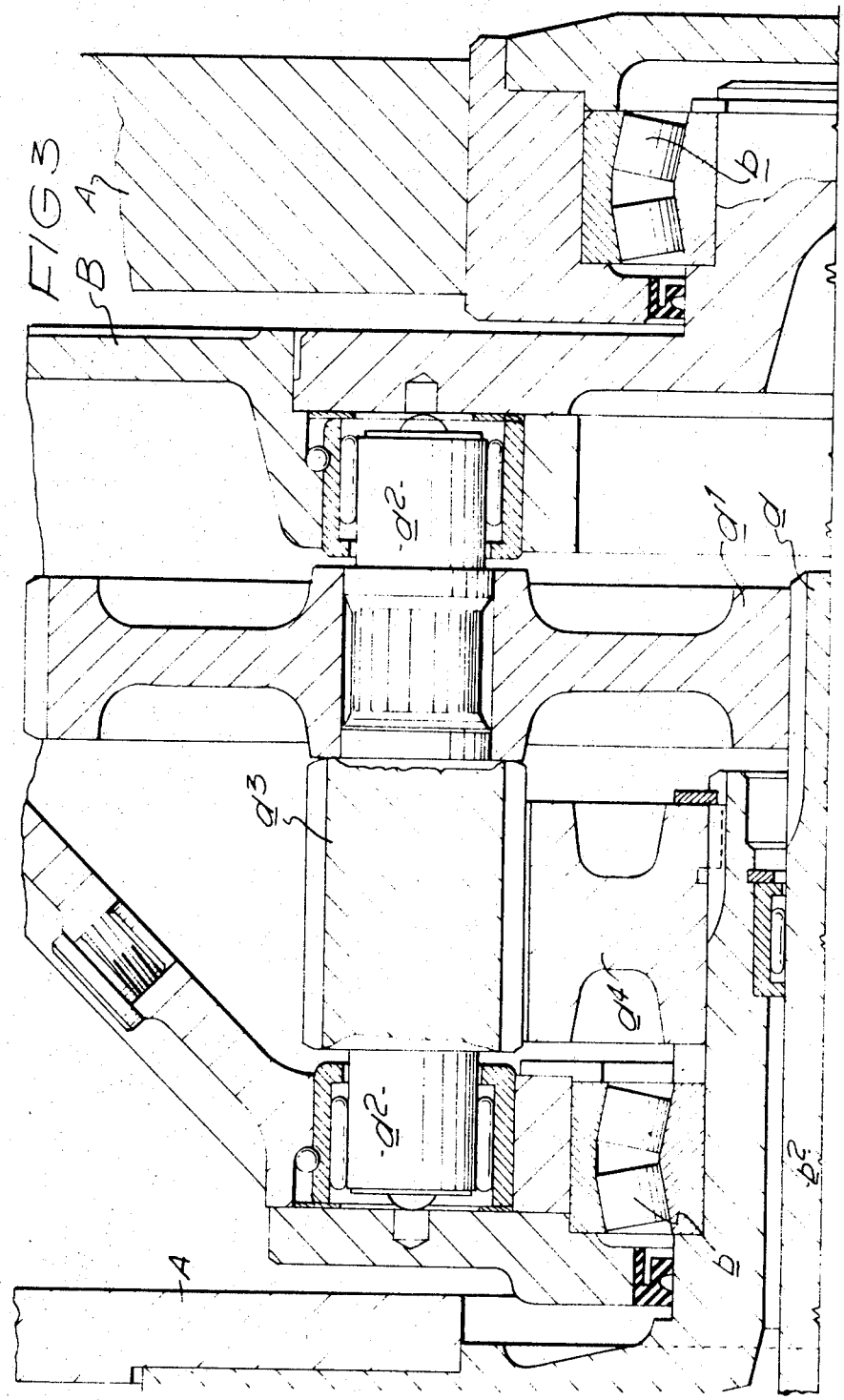

WHEEL OR DRUM DRIVES

This invention relates to improvements in wheel or drum drive units.

According to the invention a wheel or drum unit comprises a wheel or drum mounted to rotate in end casings on one of which is mounted a motor driving spindle concentric with wheel or drum axis, a pinion mounted on the spindle driving planetary pinions keyed on shafts journaled in the wheel, the shafts also carrying stationary pinions keyed to a member affixed to an end casing to cause the wheel or drum to rotate about the stationary pinion.

Figure 1:
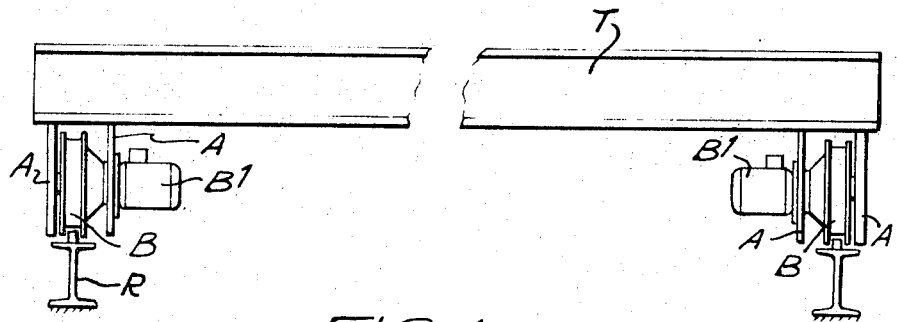
Figure 4:
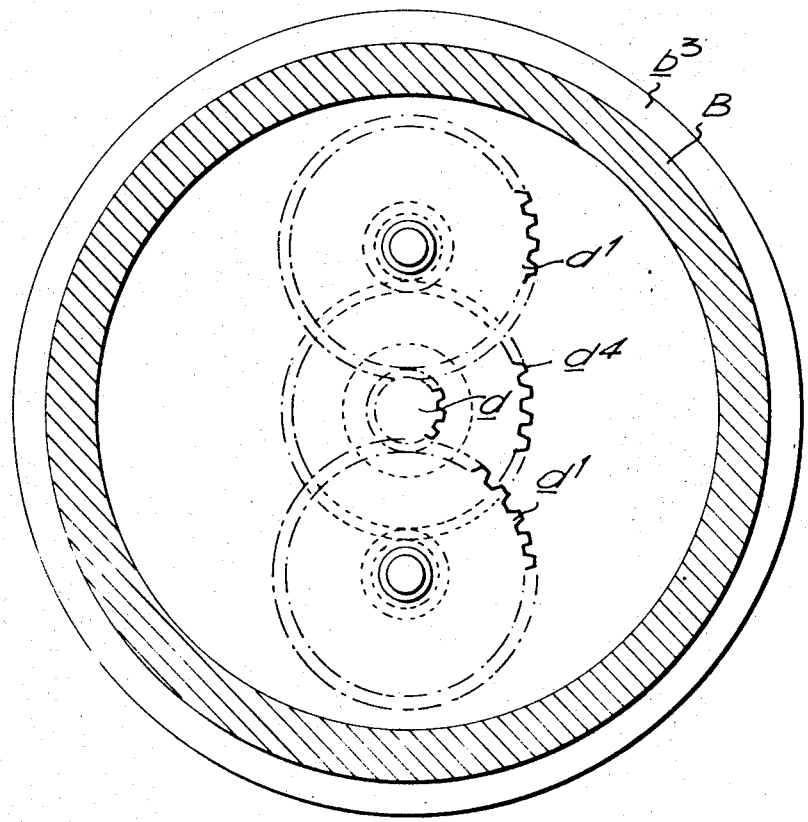

The invention will be described with reference to the accompanying drawings:

FIG. 1 is a diagrammatic elevation showing drive units mounted on an overhead crane carriage, FIG. 2 is a side elevation partly in section through a unit, FIG. 3 is an enlarged vertical section of part of the drive unit, FIG. 4 is a section on line 4—4 FIG. 2.

The drawings show a unit for driving a crane traverse carriage or trolley on rails but the unit is applicable for driving any wheel or drum on a trolley, truck, conveyor or hoist.

The unit comprises a depending end carriage A mounted on a transverse carriage or trolley T for an overhead crane. A hollow wheel or drum B is mounted to rotate in bearings $b$ in stationary members or reaction arms $b^1$ bolted or otherwise secured to the end carriage A, a flanged motor $B^1$ is mounted on the end carriage A and drives a spindle $b^2$ passing through one member $b^1$ and arranged concentrically with the wheel or drum.

A toothed drive pinion $d$ is keyed to the motor spindle $b^2$ engaging two or more planet pinions $d^1$ each keyed on a shaft $d^2$ carried in bearings inside the wheel, a pinion $d^3$ being also keyed on each shaft $d^2$ engaging a fixed pinion $d^4$ keyed to one stationary member $b^1$.

The motor drives the spindle $b^2$ and pinion $d$ which rotates the planet pinions $d^1$ and the pinions $d^3$ engaging the stationary pinion $d^4$ thereby causing the casing of the wheel or drum B to rotate at a reduced speed relatively to the speed of the motor.

The wheel B may be formed with a flanged fellow $b^3$ for engaging a rail R on the crane.

Nylon keys are preferably employed for securing the various pinions to their shafts to reduce noise and the pinions are mounted in a closed chamber in the wheel or drum B housing a lubricant.

I claim:

1. In an overhead travelling crane comprising a transverse member having depending drive mechanism mounting carriages at opposite ends disposed above parallel rails, each of said carriages comprising support means fixed to said transverse member, a motor mounted on said support means and having an output spindle, a drive pinion fixed on said spindle, a hollow drive wheel rotatably mounted on said support means and peripherally formed to roll along said rails, and speed reduction means between said said spindle and the wheel comprising a fixed pinion rigidly mounted on said support means coaxially of said drive pinion within said wheel, and compound planet pinion means disposed within said wheel rotatably mounted on said wheel and meshed with said drive pinion and with said fixed pinion.